June 9, 1964 J. C. GARWOOD 3,136,062

GEOMETRICAL INSTRUMENTS

Filed May 9, 1961 3 Sheets-Sheet 1

INVENTOR

JAMES C. GARWOOD

BY J. M. Trundle

ATTORNEY

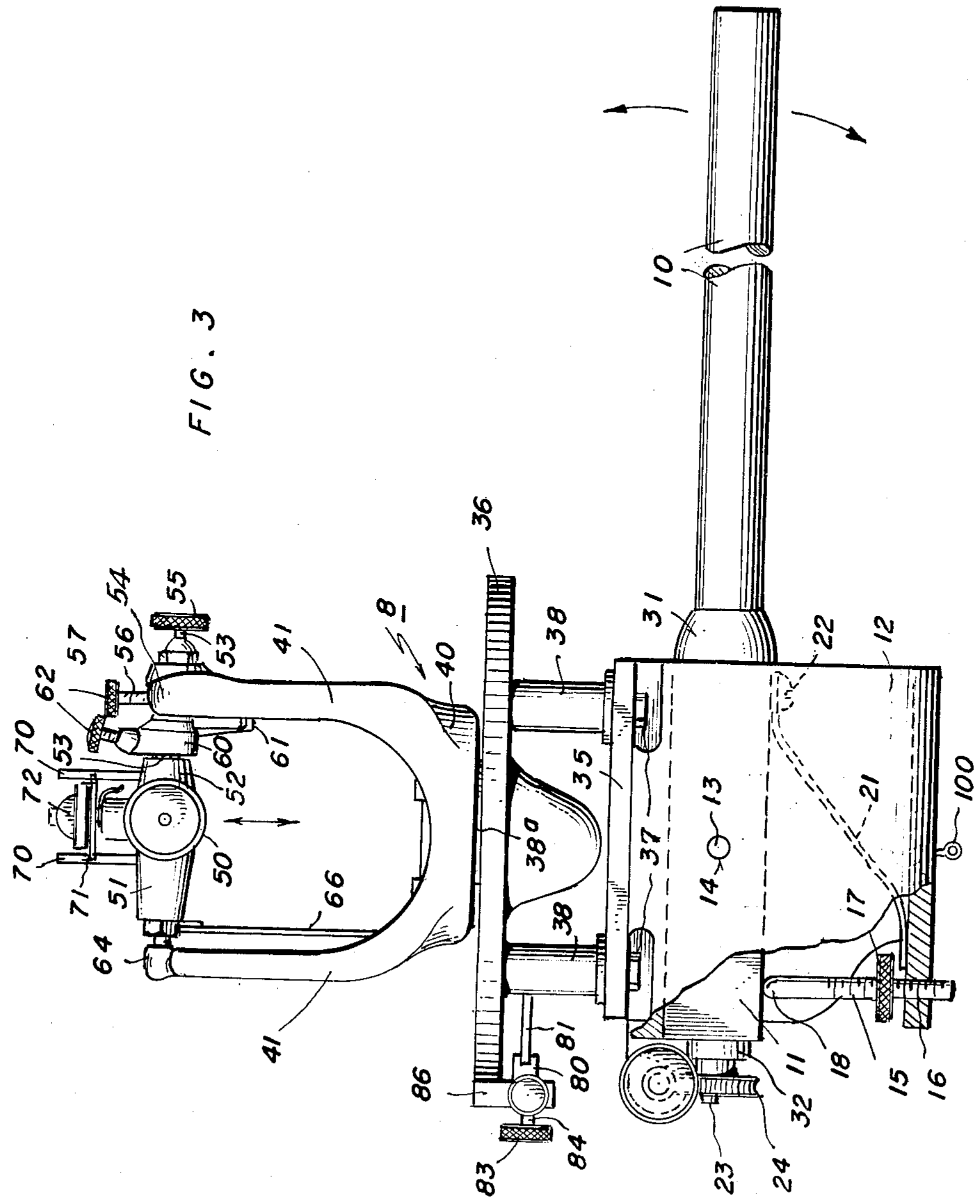
INVENTOR
JAMES C. GARWOOD
BY J. Y. Trundle
ATTORNEY

June 9, 1964 J. C. GARWOOD 3,136,062
GEOMETRICAL INSTRUMENTS
Filed May 9, 1961
3 Sheets-Sheet 3
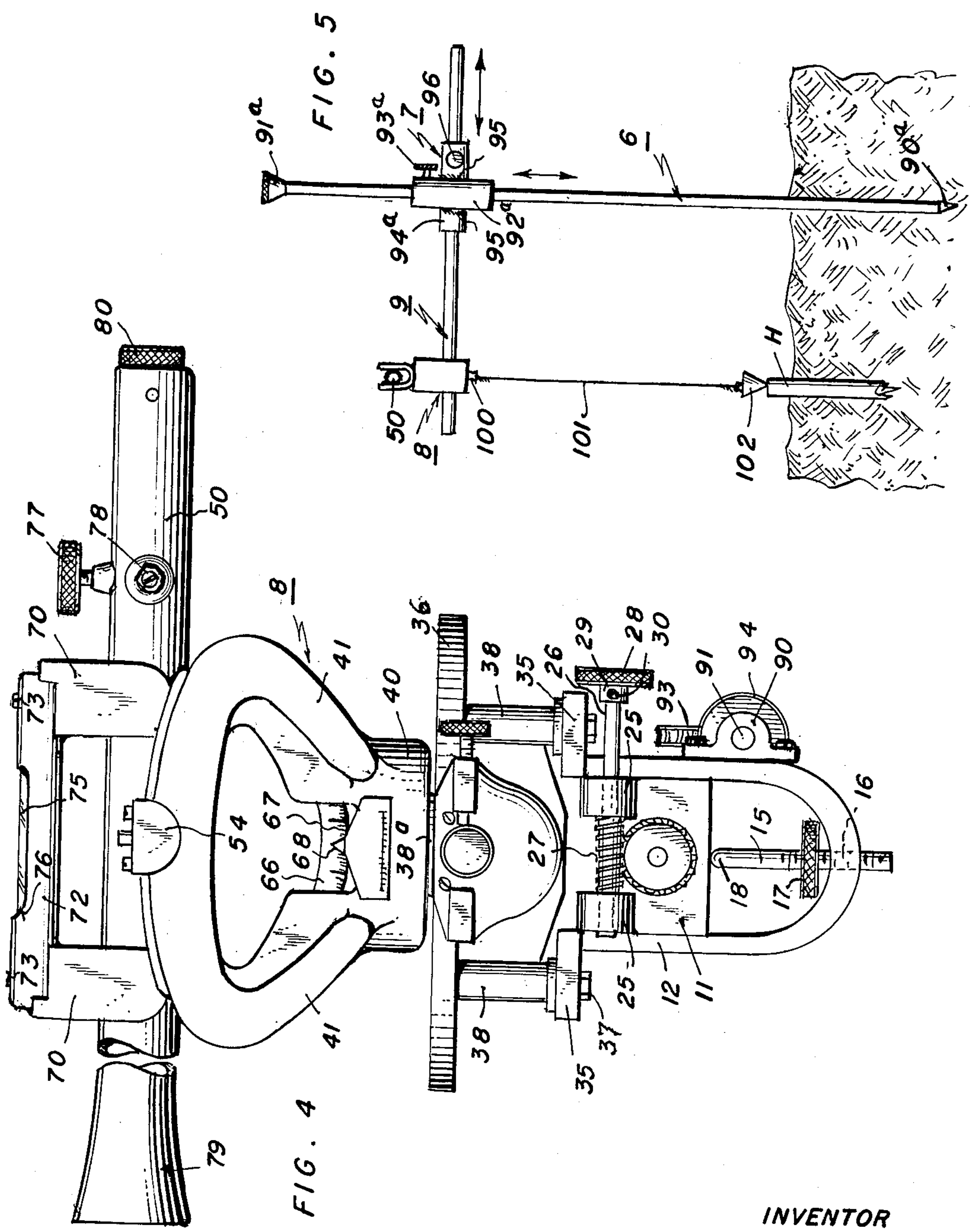
INVENTOR
JAMES C. GARWOOD
BY J. M. Trumble
ATTORNEY 3,136,062
GEOMETRICAL INSTRUMENTS
James C. Garwood, Rte. 3, Box 39-A, Manassas, Va.
Filed May 9, 1961, Ser. No. 108,848
6 Claims. (Cl. 33—46)

The present invention relates to improvements in geometrical instruments, and more particularly to an optical sighting instrument for use in the projection and observation of sight lines in vertical and horizontal planes and adapted to be used in the laying out of various sewage system projects and other construction work.

One object of the invention is to provide an instrument which is capable of being used in pipeline construction projects such as sewage systems in order to more precisely construct the sewer line and facilitate accurate excavation of the sewage ditch and the laying of the pipe.

Another object is to provide a geometrical instrument which can be adjusted vertically and horizontally to position the center of the optical axis of the observation device a predetermined distance from a ground marker denoting elevation and depth for the proper placement of the sewer or other pipe in accordance with accepted practice.

Another object is to provide a sight line instrument for use in sighting over a series of marker elements arranged in predetermined positions to enable the operator to determine and facilitate the true alignment of various excavations such as sewage systems and similar constructions.

Another object is to provide a geometrical instrument and sight line device which is adapted to be used to advantage in setting up grade lines or grade boards between various structures and appurtenances on storm and sanitary sewer systems in which the system includes pipelines, the inverts of which must lie on predetermined grades to insure a proper flow rate in the system.

Another object is to provide a geometrical instrument of the above-mentioned type which can be used in developing other tangential sight lines for runways, curves, drainage ditches and the like.

Another object is to provide an instrument of the above-mentioned type which is designed to permit intermediate staking if desired, and stationing between various appurtenances of drainage and sanitary systems to permit ditching at the proper grade inclination to insure an adequate flow rate from one appurtenance to another.

Other objects and advantages of the invention will become apparent during the course of the following description of the accompanying drawings wherein:

FIGURE 2 is a top elevational view of the gometrical instrument showing the same detached from its ground supporting rod.

FIGURE 3 is a side elevational view of the geometrical instrument showing the manner in which the telescope can be adjusted about the axis of the supporting arm and about another axis extending at right angles thereto.

Figure 1:
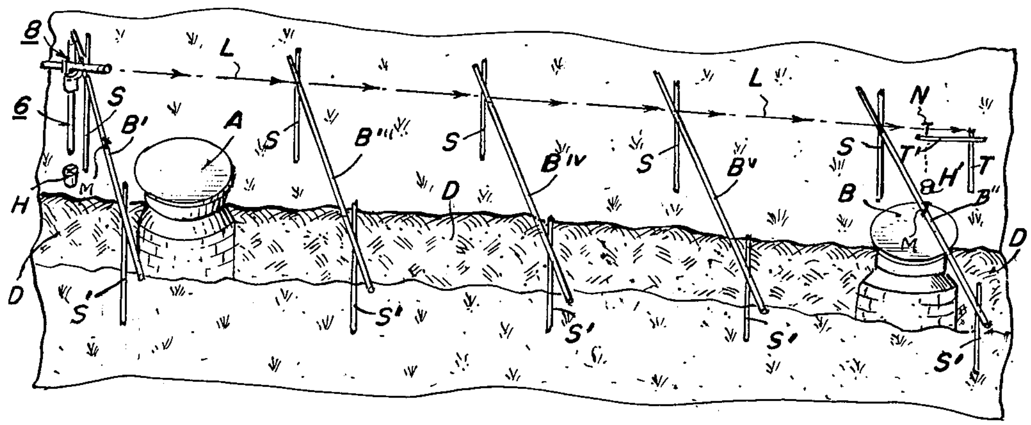
FIGURE 1 is a perspective view illustrating one of the uses to which the device may be applied to insure the proper inclination of the sewer line from one manhole to another.
Figure 1:
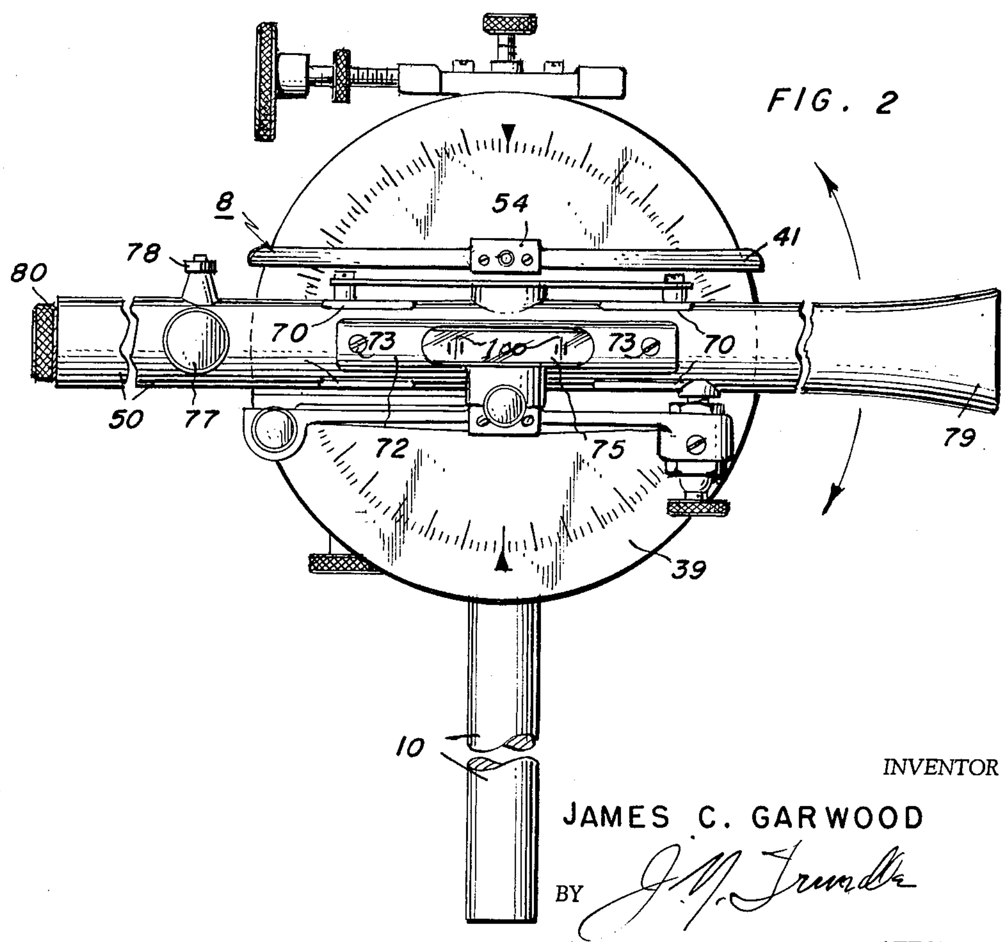

FIGURE 4 is a side elevational view of the sighting device illustrating the end portion of the adjustable support and illustrating the manner in which the same can be easily and quickly adjusted, and FIGURE 5 is a side elevational view of the supporting structure showing the manner in which the same is inserted in the ground for supporting the sighting device with respect to a marker such as a so-called hub.

In the drawings, and more in detail, there is shown a preferred embodiment of the invention and attention is first directed to FIGURE 5 wherein there is illustrated a surveyor's marker H generally indicated as being a hub and which is simply a marker with indicia thereon indicating the sea level and also the depth of cut to be made at an offset distance from the marker. These dimensions are usually in feet and fractions thereof. In the laying out of sanitary systems the sanitary engineer usually prepares a so-called cut sheet from a blue-print to indicate the location of the markers in properly constructing the sanitation ditch and the installation of the pipeline, as well as other appurtenances of the sewage or sanitation system. After the markers are installed by a surveyor it is the usual practice for the excavator to erect batter or grade boards adjacent the markers to determine the center line and depth of pipe to be installed.

The present invention simplifies the excavating operation and installation of the pipeline, as well as such appurtenances as manholes and the like. As shown in FIGURE 5 the invention comprises a ground inserted bar generally designated 6 having an adjustable fixture generally designated 7 for supporting the instrument likewise generally designated 8. The instrument can thus be adjusted vertically on the shaft or monopod 6 and can similarly be adjusted horizontally by adjustment of the rod 9 as indicated in FIGURE 5.

The instrument 8 is similar in construction to the sighting device of a surveyor's instrument and is adapted to be supported on a round bar 10, FIGS. 2 and 3 which is provided with a reduced shaft portion at one end rotatably mounted in a supporting block 11. The supporting block 11 being suitably bored to receive the reduced end of the shaft 10.

Rockably mounted on the bearing block 11 is a U-shaped frame member 12 which is supported on trunnions 13 integrated with the bearing block 11 and received in opposed openings 14 in the U-shaped frame member 12. Threaded in the U-bend of the frame member 12 is an adjusting screw 15 which extends through a correspondingly threaded opening 16 in the U-bend of the frame and is provided on one end with a knurled operating knob 17. The other end of the adjusting screw 15 is provided with a ball head 18 and engages the underside of the bearing block 11. A flat leaf spring 21 has one of its ends bearing against and secured to the underside of the bearing block 11 by means of a suitable fastener element 22, while the opposite end of the leaf spring bears against the internal surface of the U-bend portion of the frame 12.

Affixed to the reduced end 23 of the offset supporting arm 10 is a worm wheel 24, and the worm wheel has its hub (not shown) secured in place by a set screw or other fastening member. Integrated with the upper portion of the U-frame is a pair of bearing blocks 25 formed on the upper ends of the frame and provided with aligned bearing openings for rotatably supporting a control shaft 26. The control shaft 26 is provided with a worm 27 which drivingly engages the worm wheel 24 (FIG. 4). One end of the control shaft 26 is provided with a knurled control knob 28 which has its hub 29 secured in place by means of a set screw 30. Thus, it will be seen that rotary adjustment of the knurled knob 28 will swing the U-shaped frame 12 around the axis of the offset shaft 10 since the shaft 10 is rotatably supported in the block 11 by suitable bearing bosses 31 and 32 on the ends of the block.

The upper free ends of the U-shaped frame 12 are provided with oppositely directed flanges 35 for supporting a sight line instrument including a platform 36 having integral tubular supports 38 (FIGS. 3 and 4). The longitudinal flanges 35 are provided with suitable openings for receiving machine screws 37 which are anchored in correspondingly threaded axially extending openings in the tubular supporting feet 38. Rotatably mounted on the platform 36 as by means of a shaft 38*a* is a sight line instrument supporting yoke 40 having spaced upwardly extending arms 41 (FIGS. 3 and 4). The sight line instrument comprises a telescope 50 having a cross hair reticle of conventional design and is provided with oppositely extending integrated bosses 51 and 52. The boss 52 is provided with a shaft portion 53 which is journaled in a bearing boss 54 supported on the upper end of one of the yoke arms 41 and a knurled control knob 55 is anchored to the end of the shaft 53 to permit adjustment of the scope 50 about an axis intersecting the optical axis of the scope. A locking screw 56 is threaded in an opening in the bearing boss 54 and is provided with a knurled knob 57 to engage the shaft 53 and lock the same in a predetermined position. Also secured to the shaft 53 is the hub 60 of an indicating arm 61 and a knurled adjusting screw 62 is threaded in a boss in the hub 60 to secure the arm 61 in place. The other end of the shaft 53 is threaded as at 64 for receiving a graduated segment plate 66 which is suitably affixed to the integrated bearing member 51 on the scope 50. Thus, when the scope 50 is adjusted about a transverse horizontal axis the plate 66 with its graduations 67 will move with respect to a fixed pointer 68 suitably secured to the yoke 40.

Also integrated with the telescope 50 is a pair of upstanding arms 70 arranged in sets on both sides of the axis of the shaft 53, and said arms are bridged by supporting cradles 71 to which is attached a bubble level 72 by means of threaded fastening elements 73 which extend through the housing of the level and are anchored in the cradle support 71. The level proper includes a liquid filled tube 75 mounted in the bubble level frame 72 and is visible through an inspection opening 76 therein as usual.

A control knob 77 is provided for the scope 50 to focus the instrument. Such controls are common to instruments of this type. One end 79 of the scope is provided with an objective lens and the opposite end is provided with an eyepiece, 79 and 80 respectively. A similar adjusting member 78 is also provided on the scope.

Adjustment of the telescope about a vertical axis intersecting the optical axis of the scope is accomplished by turning the yoke 40 about the axis of the shaft 38*a*, and a locking structure is provided which includes a brake member 80 engageable with a segment 81 supported by the platform 36 so that adjustment of the knurled knob 83 will rotate an adjusting screw 84 and move the block 80 into engagement with the edge of the segment 81. The threaded shaft 84 is mounted in the corresponding opening of a bracket 86 secured to a portion of the yoke 40 and is intended to swing therewith about the axis of the shaft 38*a*, and is supported thereby in a manner not shown.

As an optional control for the U-shaped frame 12 suitable bearing brackets 90 may be secured thereto in spaced relation as shown in FIG. 4 for supporting a shaft 91 which is provided with a worm (not shown) adapted to engage a worm wheel 93 affixed to the end of the trunnion shafts 13 on one side of the bearing block 11. The worm on the shaft 91 may be manually operated by means of a knurled control knob 94.

As previously mentioned, the instrument 8 is supported by the ground inserted rod 6 which comprises a tubular metal rod having a detachable and replaceable pointed lower end 90*a* and a replaceable driving contact member 91*a* at the upper end thereof to facilitate driving the rod or monopod into the earth E as shown in FIG. 5. The adjustable fitting 7 comprises a tube 92*a* which is slidably mounted on the rod 6 and is locked in a predetermined position by means of a set screw 93*a* which is threaded in a corresponding opening in the tube 92*a* with its inner end in engagement with the monopod 6. Secured at right angles to the tube or sleeve 92*a* is a tubular sleeve 94*a* which is welded to the tube 92*a* as at 95. A manually operable set screw 96 is similarly threaded in an opening in the tube 94*a* so that its inner end engages the rod 10. Thus, the instrument 8 can be adjusted to various heights by sliding the tube and locking the same in various positions on the monopod 6 and the instrument can be offset from the center of the rod 6 by sliding the rod 10 in the tube 94*a* and locking the same by the set screw 96.

It is intended to provide a loop or eye or similar reference surface 100 on the U-shaped frame 12 of the instrument to facilitate the suspension of a plumb line 101 having a plumb bob 102 as illustrated in FIGURE 5 or facilitate accurate measurements from the instrument axis to the surface of the hub. Since the distance from the center or optical axis of the telescope is known with respect to the underside of the U-shaped frame 12, the plumb line 101 may be of a suitable length and can be tied to the eye 100 at various heights or distances from the end of the plumb bob 102 to the lower portion of the frame 12.

The instrument 8 can be supported on the platform 36 by a conventional universal joint and various controls can be provided as an optional structure.

For a consideration of the operation of the invention attention is directed to FIGURE 1 wherein there is shown an excavation ditch D extending between manholes A and B. It will be assumed thaat the manhole A has been erected and that the manhole B is to be constructed a predetermined distance from the existant manhole A. It will also be assumed that markers or hubs as shown in FIGURE 5 and indicated by H have previously inserted in the ground by the sanitation engineer in accordance with the usual practice in which the markers are offset horizontally from the center line of the sewage pipe the usual distance of ten feet. The marker H adjacent the manhole A will be the first to be considered, and it will be assumed that the marker bears the indicia 9.31 feet. This indicia is a correct measurement of the distance from the top of the hub to the invert of the manhole A. Since this distance is nearly 10 feet a proper batter board distance of 12 feet would be selected. Accordingly, a batter board B′ is installed and is supported by steel stakes S and S′ on each side of the ditch D. The batter board B′ adjacent the marker H is installed so that its top edge is exactly 12 feet from the invert, and hence would be 2.69 feet above the surface of the marker H. Thus, it will be seen that the combined distance from the invert to the top of the surface of the marker H and the distance from the top of the surface of the marker H to the batter board B′ will equal 12 feet exactly. Let it also be supposed that a manhole B is to be constructed a predetermined distance from the manhole A, and the manhole B is provided with a marker H′ similar to the marker H, but is marked with the numerals 8.74 feet which equals the distance from the invert of the manhole B to the top of the marker H (FIG. 1). Thus, stakes S and S′ are driven in the ground on opposite sides of the ditch D and a batter board B″ is supported on the stakes to extend over the manhole B. Since the distance from the invert to the top of the marker H′ with respect to the manhole B is 8.74 feet, it will be seen that the selected batter board height of 12 feet will leave a difference of 3.26 feet. Thus, the total distance from the invert to the batter board B″ will equal 12 feet, and with the distance of the manholes spaced a distance of 200 feet a grade rate between the manholes will have been established at the rate of .025 per foot. This is estimated from the usual procedure by the difference in elevation marked on the top of the hub and in the present case where the elevation of the hub H adjacent the manhole A would be 235 feet and the manhole elevation adjacent the hub H′ would be 230 feet. These numerals designate sea level, and since there is a distance of 5 feet in elevation between the manholes A and B the usual procedure is to merely divide this difference by the distance between the manholes.

During the excavation of the ditch D other batter boards B′ and supporting stakes S and S′ can be installed as excavation of the ditch progresses from the manhole B. Usually the ditch is excavated upgrade and the batter boards between the manholes are installed as work progresses.

After the batter boards B′ and B″ adjacent the manholes A and B respectively have been installed, the operator inserts the monopod of rod 6 into the earth a sufficient distance to support the same and preferably offset from the hub H in a direction away from the hub H and the ditch. With the stake in position as shown in FIGURE 1, and the monopod or rod 6 installed, the offset arm 9 carrying the instrument 8 is inserted in the tube 94*a* and the fitting 7 is adjusted vertically along the monopod or rod 6 such that the distance between the optical axis of the telescope 50 and the top of the hub H (FIG. 5) is equal to a distance of 2.69 feet. Similarly, a target T having an arm T′ is driven in the ground adjacent the manhole B and the end of the arm T′ is provided with a nail or other marker N. The distance between the top of the hub H′ and the top of the nail should be the desired distance indicated above as 3.26 feet combined with the hub height 8.74 feet from the invert totaling the batter board height of 12 feet.

Assuming a terrain of uneven and irregular shape, it will be seen that when the operator aligns the crosshairs of the reticle of the telescope 50 with the top of the nail N, he will establish a sight line L which will give the proper distance from the sight line to all of the inverts of the sewer pipe along the distance between the manholes. By adjusting the instrument 8 by manipulating the knurled adjusting knobs 17 and 28, it will be seen that the telescope may be adjusted such that a true sight line is established along a vertical and horizontal path.

When the intermediate batter boards B‴, B<sup>iv</sup> and B<sup>v</sup> are installed the operator can then sight along the ends thereof and place the horizontal reticle crosshair in alignment therewith and the vertical crosshair of the reticle in alignment with the supporting stakes S. When all of the batter boards have been brought into registry with the sight line measurements can be taken from the top of the batter boards to the pipe inverts, and since the batter boards can be installed various distances throughout the 200 foot length of the ditch D, it will be seen that it is unnecessary to establish hub markers at intermediate points, thus eliminating considerable work on the part of the sanitation engineer by constant checking and surveying which results in a considerable saving of labor.

Obviously, the instrument 8 can be arranged adjacent the manhole B and the target T, T′ and nail N can be arranged adjacent the hub H of the manhole A, and since excavation usually progresses upgrade it is to be understood that the illustration given is merely for explanatory purposes. The operator can determine the direction of the grade by inspecting the bubble of the bubble level with reference to indicating marks 100 (FIG. 2) located adjacent the ends of the bubble tube 75. Thus, as shown in FIGURE 1 when the telescope of the instrument is properly sighted on the target N the bubble of the level will be located adjacent the marker 100 on the right hand side viewing FIGURE 2, and when the instrument 8 and nail N are reversed with the instrument 8 adjacent the manhole B and the sight line extending in the opposite direction the bubble of the level will be in the proximity of the marker 100 on the left side viewing FIGURE 2.

Since the stakes S and S′ are inserted in the ground on opposite sides of the ditch D with the stakes S adjacent the hubs H and H′ spaced a distance of 10 feet from the center line of the pipe, it is merely necessary to insert markers M such as a nail or the like a distance equal to 10 feet from the stakes S, and after this dimension has been established the operator can then accurately measure and check the distance from a pipe invert at one end thereof by inserting a bracket-type foot member on a vertical measuring rod so that the bracket end of the measuring bar projects into the pipe while the other end of the bar is aligned with the marker or nail M on the batter board such as B′ and B″.

Obviously, dimensions other than the selected one of 12 feet may be considered for the batter board height and this depends upon the irregularity of the terrain, as well as the depth of the ditch to be excavated. It will thus be seen that the device of the present invention permits the correct positioning and installation of the sewage pipe as well as the appurtenances thereof such as manholes and the like, also that the distance established by the selection of a batter board of a predetermined height enables the ditch to be excavated rapidly without the necessity of referring to intermediate markers. When the pipe is laid or installed after the ditch has been excavated, batter boards may be set up if desired along the length of the pipeline to center the pipe with respect to the ditch and at the same time to check and establish the dimension from the invert of the pipe sections to the top of the hub marker. In the use of the device the bubble level 72 will always indicate an inclination of the sight line L so that the operator will be sure that the grade established is proper to facilitate the required flow rate between the manholes A and B.

Also, it is pointed out that the instrument 8 can be accurately and quickly positioned above a marker or hub H a predetermined distance and can be adjusted to equal the proper batter board height. This is obtained by adjusting the instrument above the marker or hub a predetermined distance which when added to the distance indicated on the marker will equal the distance from the invert of the pipe or manhole to the batter board. It will be seen that the batter board height in feet will be selected which is equal to the sum of the so-called cut distance in feet indicated on the hub H and the distance between the optical axis of the instrument scope and the top surface of the hub H.

When the intermediate batter boards are used, it will be reasonably simple with little effort to place the same in their proper position by merely moving them to the right or left or vertically so that the ends as above pointed out are in registry with the sight line. It has been found advantageous that when the construction is temporarily postponed the operator may re-position the stakes and batter boards so that they register with the sight lines in the event that they have become accidentally displaced by other construction operations during the temporary postponement. The hub H′ adjacent the manhole B is plumbed and aligned with the nail N on the T-head T′ secured to the target T. This can also be accomplished by the use of a plumb line and the distance accurately measured with a rule.

Further, it is to be understood that the illustration given above, is indicative of one of the many uses to which the device may be applied, and that the dimensions given are purely for the purpose of illustration. When a sight line has been established as above indicated, this dimension is maintained in all calculations throughout the length of the intended pipeline between manholes. The distance between manholes in present day sanitation construction is between 20 to 700 feet, and the distances given with respect thereto in the above example are also for the purpose of illustration. Generally the spacing of manholes in a sewage or sanitation system is not more than 400 feet.

Accordingly, invention proposes to provide an instrument which can be conveniently and quickly used to establish a sight line between the inverts of manholes and structures of predetermined loci whereby the reference of said sight line controls installation of pipe so that it will meet approval and pass inspection in accordance with the specifications set down in the regulations governing combined sewage and storm sanitation systems.

It is to be understood that the form of the invention herewith shown and described is to be taken as a preferred embodiment thereof, and that various changes in the shape size and arrangement of parts may be resorted to without departing from the spirit of the invention or the scope of the subjoined claims.

What I claim is:

1. A geometrical instrument for sighting and determining invert depths and grade inclinations in sanitary construction delineated by hub markers, comprising a single rod member forming a vertical support adapted to be inserted in the ground in offset relation from one of said markers, a horizontal arm mounted on said vertical support for vertical and horizontal adjustment, a supporting member rockably mounted on the free end of said horizontal arm to swing about the axis thereof, and a telescopic sight line instrument mounted on the supporting member for swinging movement about vertical and horizontal axes, said instrument being adapted to be adjusted and sighted above said markers along a sight line a predetermined distance thereabove.

2. A geometrical instrument for sighting and determining proper invert depths and grade inclinations in sanitary construction and sewage systems delineated by a series of hub markers, comprising a single rod member forming a vertical support having a ground penetrating point to be inserted in the earth, a fitting mounted on said rod for vertical adjustment to various predetermined positions, an offset horizontal arm adjustably mounted in said fitting for adjustment horizontally, a U-shaped supporting member rockably mounted on the free end of said horizontal arm to swing about the axis thereof, a sighting instrument adjustably mounted on the U-shaped supporting member to sight along predetermined distances above said markers in establishing proper invert depths indicated on said markers, and manually operable screw mechanism for adjusting said U-shaped supporting member about said axis.

3. A geometrical instrument for correctly determining invert depths and grade inclinations in the construction of sewage systems delineated by hub markers, comprising a single vertical shaft having a driving contact on one end and a penetrating point on the opposite end, a fitting slidably mounted on said vertical support for movement and adjustment in a vertical direction, an offset arm extending horizontally and received in said fitting for adjustment in a longitudinal and horizontal direction, a frame member rockably mounted on the free end of said horizontal arm to swing about the axis thereof, a platform secured to said frame member, a telescope sight line instrument having a reticle pivotally on the platform to swing about a vertical axis, and a manually operable screw member for adjusting said sight line instrument about said arm axis and along an inclined sight line a predetermined distance above said hub markers.

4. A geometrical instrument for correctly determining invert depths and grade inclinations in sanitary sewage systems delineated by a series of hub markers and comprising a single vertical supporting shaft having a driving contact on one end and a ground penetrating point on the other end to facilitate insertion in the earth adjacent one of said markers, a cruciform fitting slidably mounted on said shaft adapted to be adjusted to various predetermined positions thereon, an offset arm adjustably mounted in said fitting, a supporting frame member rockably mounted on the free end of said horizontal arm to swing about the axis thereof, a platform mounted on said frame member, and a sight line instrument adjustably mounted on the platform for adjustment about vertical and horizontal axes and adapted to be positioned with its optical axis center a predetermined distance above one of the markers to establish a sight line of equal dimensions to the invert depth of the sewage system along said other markers.

5. A geometrical instrument for determining invert depths and grade inclinations in sanitary sewage constructions delineated by a series of hub markers having depth inclinations thereon, comprising a single vertical supporting shaft having a ground penetrating point on the lower end adapted to be inserted in the earth, a fitting slidably mounted on said support and adapted to be adjusted to various heights above one of said hub markers, an offset arm slidably mounted in said fitting and arranged for horizontal, and longitudinal sliding adjustment, a support rockably mounted on said offset arm to swing about the axis thereof, a platform mounted on said support, a sight line instrument adjustably mounted on the platform to swing about vertical and horizontal axis and adapted to be positioned with the center of its optical axis a predetermined distanace above one of said markers corresponding to the indicia thereon, and a manually operable screw member for adjusting said support and platform about said arm axis, said sight line instrument being adapted to be adjusted on an incline to establish a sight line over the other markers so that the distance between the invert depth of the system and the sight line will be equal for each marker.

6. A geometrical instrument for aligning and determining grade inclinations and invert depths of a sewage system delineated by hub markers, comprising a vertical support having a ground penetrating point adapted to be inserted in the earth and a driving contact on the upper end thereof, a fitting slidably mounted on said support for vertical adjustment, an offset arm adjustably mounted in said fitting for horizontal adjustment, a U-shaped frame member rackably mounted on the free end of said arm to swing about the axis thereof, a manually operable screw member for adjusting said frame member about said axis, and a sight line instrument mounted on said U-shaped frame member and adapted to be positioned with its optical axis a predetermined distance above one of said hub markers, said instrument being adjusted to establish a sight line a distance above the other markers equal to the sum of the distance indicated on the first marker and the spacing thereabove of the optical axis of said sighting instrument the bend of said U-shaped frame member being arranged in encircling relation to said horizontal arm with the upstanding portions thereof connected to said platform.

References Cited in the file of this patent

UNITED STATES PATENTS

| | | |
|---|---|---|
| 297,164 | Randolph | Apr. 22, 1884 |
| 1,105,149 | Lyford et al. | July 28, 1914 |
| 2,535,722 | Cooke | Dec. 26, 1950 |
| 2,549,244 | Schuett | Apr. 17, 1951 |
| 2,598,529 | Fritz | May 27, 1952 |
| 2,762,128 | Whelan | Sept. 11, 1956 |
| 2,835,036 | Peresenyi | May 30, 1958 |